United States Patent
Rouhani-Kalleh

(10) Patent No.: US 8,041,733 B2
(45) Date of Patent: Oct. 18, 2011

(54) SYSTEM FOR AUTOMATICALLY CATEGORIZING QUERIES

(75) Inventor: Omid Rouhani-Kalleh, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 189 days.

(21) Appl. No.: 12/368,074

(22) Filed: Feb. 9, 2009

(65) Prior Publication Data

US 2010/0094854 A1    Apr. 15, 2010

Related U.S. Application Data

(63) Continuation-in-part of application No. 12/251,146, filed on Oct. 14, 2008.

(51) Int. Cl.
*G06F 7/00* (2006.01)
*G06F 17/30* (2006.01)

(52) U.S. Cl. ........................ 707/771; 707/763

(58) Field of Classification Search .................. None
See application file for complete search history.

(56) References Cited

U.S. PATENT DOCUMENTS

| | | | |
|---|---|---|---|
| 7,548,915 B2 | 6/2009 | Ramer et al. | |
| 7,739,276 B2 * | 6/2010 | Lee et al. | 707/723 |
| 7,779,009 B2 * | 8/2010 | Chowdhury et al. | 707/737 |
| 2002/0035555 A1 | 3/2002 | Wheeler et al. | |
| 2005/0080795 A1 | 4/2005 | Kapur et al. | |
| 2007/0038450 A1 * | 2/2007 | Josifovski | 704/255 |
| 2007/0156669 A1 | 7/2007 | Marchisio et al. | |
| 2008/0097982 A1 | 4/2008 | Gupta | |
| 2008/0313142 A1 | 12/2008 | Wang et al. | |
| 2009/0024605 A1 * | 1/2009 | Yang | 707/5 |
| 2010/0094826 A1 | 4/2010 | Rouhani-Kalleh | |
| 2010/0094846 A1 | 4/2010 | Rouhani-Kalleh | |
| 2010/0094855 A1 | 4/2010 | Rouhani-Kalleh | |

OTHER PUBLICATIONS

Silviu Cucerzan, "Large-Scale Named Entity Disambiguation Based on Wikipedia Data," Microsoft Research, Jun. 2007, 9 pages.

(Continued)

*Primary Examiner* — Khanh Pham
*Assistant Examiner* — Azam Cheema
(74) *Attorney, Agent, or Firm* — Hickman Palermo Truong & Becker LLP; Eric L. Sutton

(57) ABSTRACT

A system and method is provided for recognizing a pattern in queries and using the recognized pattern to categorize queries under existing query categories. An entity text that represents a real-world object is detected in a query. The entity text is categorized into an entity category. The query is then rewritten as an annotated query by replacing the entity text with a placeholder for any entity matching the entity category. The annotated query is compared to other queries that are associated with query categories to find a query category that is frequently associated with the annotated query. The query category frequently associated with the annotated query is used to generate a rule. The rule indicates that any query matching the annotated query is likely to fit into the query category. The rule can be used to assign categories to queries or correct incorrectly categorized queries.

23 Claims, 11 Drawing Sheets

OTHER PUBLICATIONS

Kamal Nigam, et al., "Using Maximum Entropy for Text Classification," School of Computer Science, Carnegie Mellon University, Just Research, 1999, 7 pages.

Fabian M. Suchanek, et al., "YAGO: A Core of Semantic Knowledge Unifying WordNet and Wikipedia," WWW 2007/Track: Semantic Web, Session: Ontologies, WWW 2007, May 8-12, 2007, Banff, Alberta, Canada, ACM 978-1-59593-654-7//07/0005, pp. 697-706.

DBPEDIA, "wiki.dbpedia.org: 3.1 Downloads," http://wiki.dbpedia.org/Downloads31, data retrieved Sep. 19, 2008, pp. 1-6.

Suchanek, et al, "YAGO: A Core of Semantic Knowledge Unifying WordNet and Wikipedia"; May 8-12, 2007, ACM; Canada, 10 pages.

U.S. Appl. No. 12/251,146, filed Oct. 14, 2008, Final Office Action mailed Jun. 23, 2011.

* cited by examiner

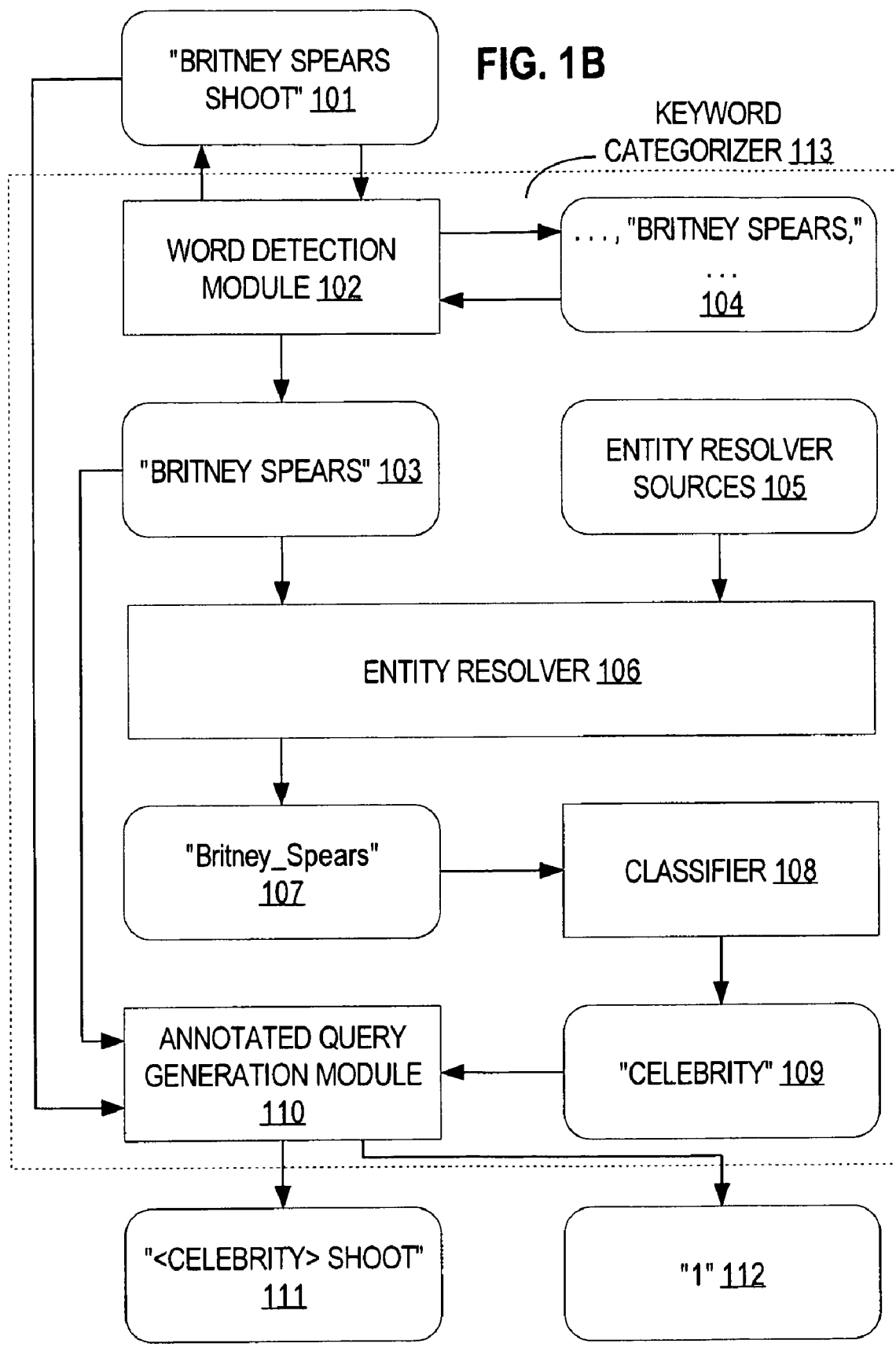

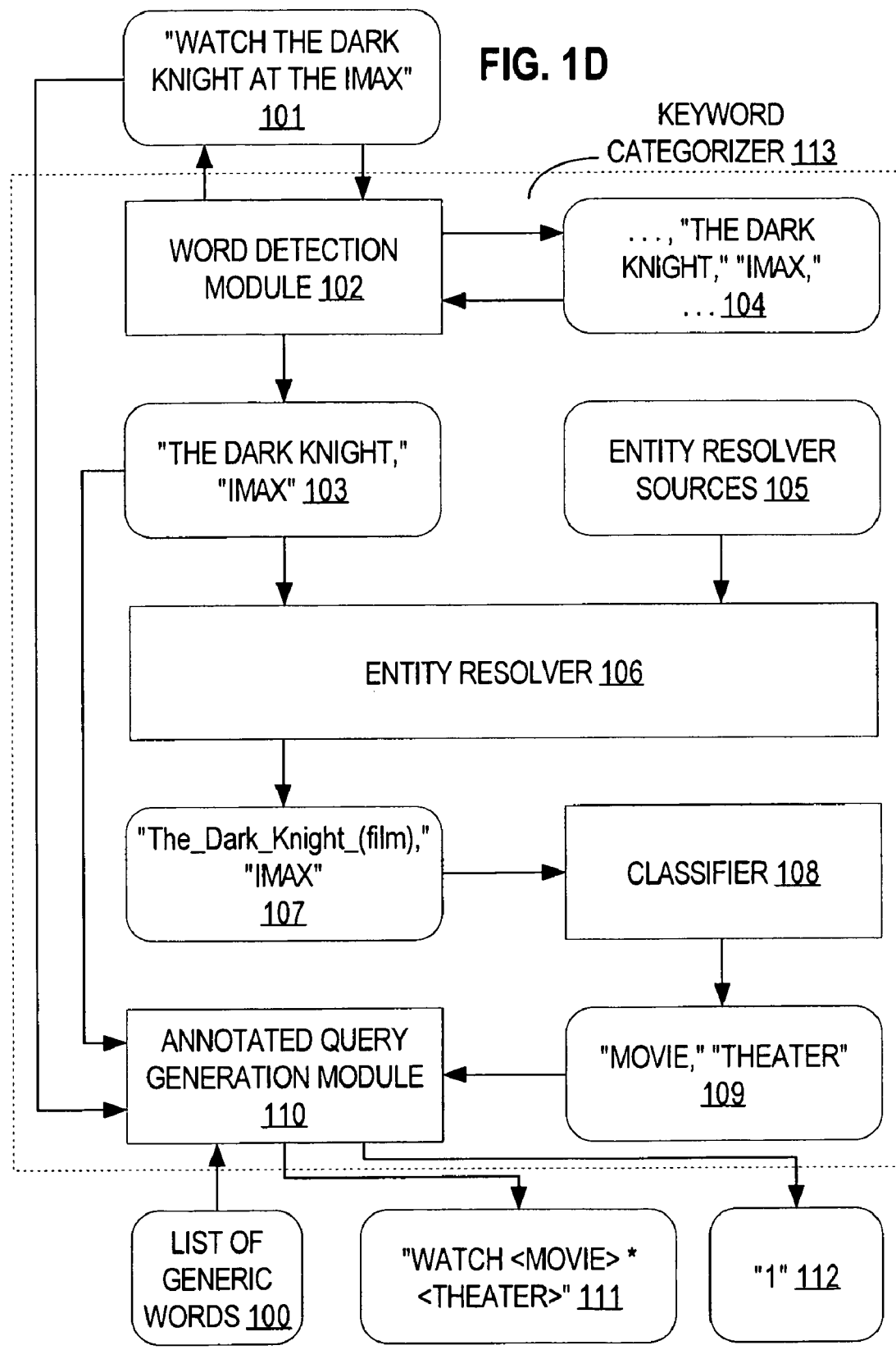

ID

SYSTEM FOR AUTOMATICALLY CATEGORIZING QUERIES

CROSS-REFERENCE TO RELATED APPLICATIONS; BENEFIT CLAIM

This application claims benefit as a Continuation-in-part of application Ser. No. 12/251,146, filed Oct. 14, 2008, the entire contents of which is hereby incorporated by reference as if fully set forth herein, under 35 U.S.C. §120. The applicant hereby rescinds any disclaimer of claim scope in the parent application or the prosecution history thereof and advises the USPTO that the claims in this application may be broader than any claim in the parent application.

The Yet Another Great Ontology (YAGO) system is discussed in this application as a system for categorizing object identifiers. A more detailed description of creation, maintenance, and use of the YAGO ontology is available in Suchanek, F. M., Kasneci, G. & Weikum, G., "YAGO: A Core of Semantic Knowledge—Unifying WordNet and Wikipedia®," The 16th International World Wide Web Conference, Semantic Web: Ontologies Published by the Max Planck Institut Informatik, Saarbrucken, Germany, Europe (May 2007), the entire contents of which is hereby incorporated by reference as if fully set forth herein.

FIELD OF THE INVENTION

The present invention relates to automatic query categorization by analyzing categorized queries.

BACKGROUND

Online service providers have various schemes for categorizing queries submitted by users. Currently, an online service provider will utilize a particular query categorization scheme that is based on potentially a number of factors. Various query schemes can be tested by human beings for accuracy.

For example, suppose an online service provider categorizes a query, "The Dark Knight," under "movies." Later, a human being can look at the query and determine whether the query is correctly categorized. Because "The Dark Knight" almost always refers to the popular movie from 2008 entitled "The Dark Knight," the human being would indicate that the query is correctly categorized. When testing the accuracy of a categorized query, the human being can also investigate other instances in which the query was used. If users frequently navigated to pages relating to "movies," as determined by the human being, then the query is correctly categorized under "movies."

In the example, if the online service provider categorized "The Dark Knight" under "medieval times," then a human being could determine that the query was incorrectly categorized. Although a query using the word "Knight" may sometimes fit under the "medieval times" category, the human being would know that the "medieval times" category does not fit "The Dark Knight." Online service providers that categorize the query based on the keyword, "knight," mistake "The Dark Knight" as a term relating to the "medieval times."

If a user's query is incorrectly categorized, the user receives the wrong content in response to his or her query. In the "medieval times" example above, the user might receive content about knights, paladins, swords, shields, chariots, elves, and dragons even though the true intent of the user is to retrieve information about the movie, "The Dark Knight," which involves the superhero named Batman and the villain named Joker.

On the other hand, if the query is correctly categorized under "movies," the user may receive information that complements the user's intent to receive information about "The Dark Knight." For example, the user may receive information about other Batman movies.

Online service providers spend too much time and money to have humans manually check queries such as "The Dark Knight" to determine whether the queries are correctly categorized. A more efficient approach would not require human beings to analyze categorized queries to determine whether queries have been correctly categorized. Also, an improved query categorization method that is less error-prone than current techniques would reduce the need for manual corrections.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A through 1D are diagrams illustrating techniques and examples for recognizing a pattern in a query based at least in part on an entity detected in the query.

DETAILED DESCRIPTION

Figure 1A:
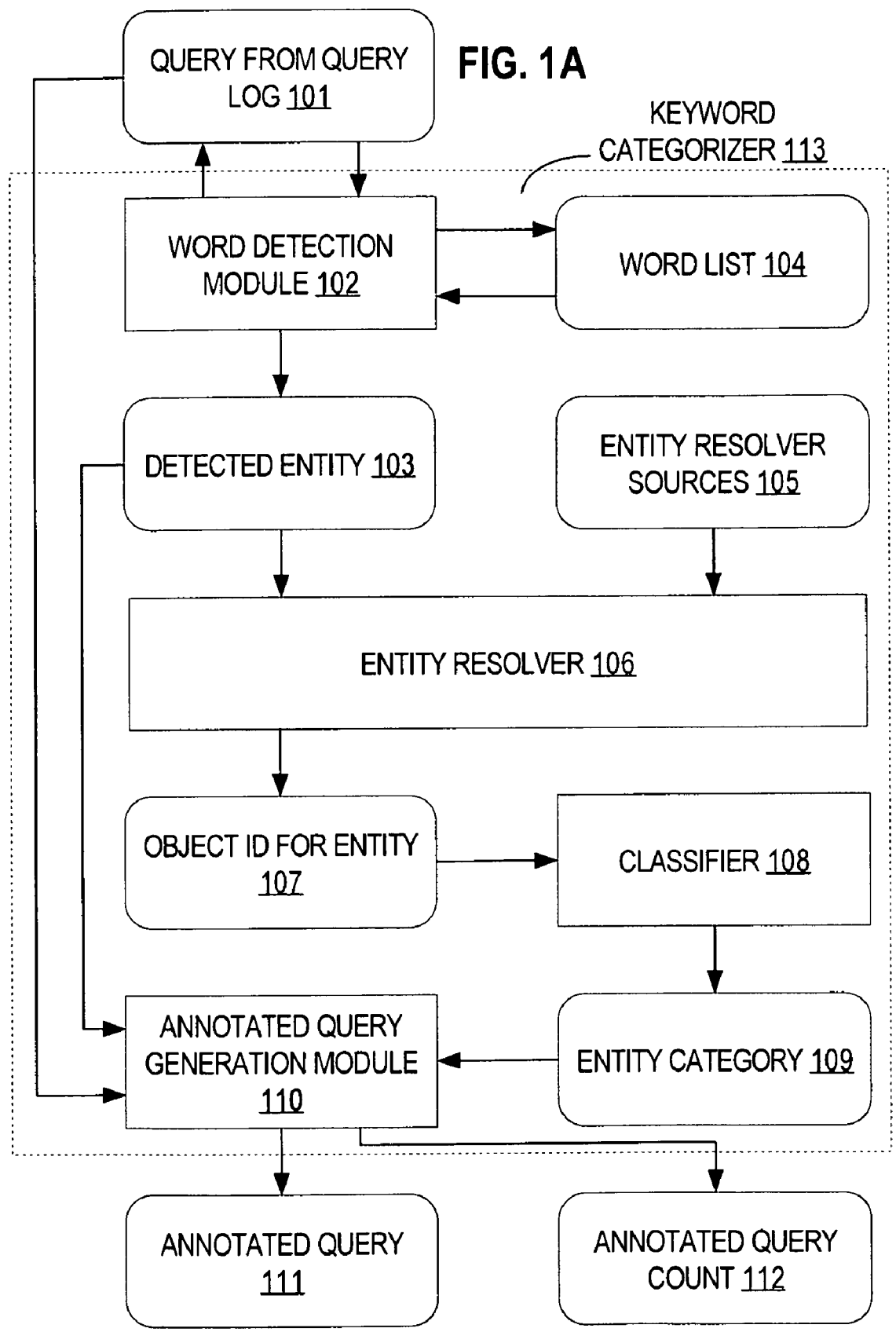

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview of Method for Automatic Query Categorization

Techniques are provided for recognizing a pattern in queries and using the recognized pattern to categorize queries under existing query categories. Queries are retrieved from a query log to be used for pattern recognition. An entity text that represents a real-world object is detected in a query. The entity text is categorized into an entity category based on information about the entity text and information about the real-world object. The query is then rewritten as an annotated query by replacing the entity text with a placeholder for any entity text matching the entity category. The portion of the annotated query that is not replaced is called the keyword text.

If the annotated query is frequently detected in the queries, then the annotated query may serve as a rule for categorizing queries. In order to determine whether the annotated query may serve as a rule, the annotated query is applied to queries that have already been categorized into query categories (also called "labeled queries"). If the annotated query is frequently associated with a query category, then the annotated query may serve as a rule to indicate that any query matching the annotated query should be categorized under the query category. A rank may be assigned to the rule, which may be based on the frequency by which the annotated query is associated with the query category compared to the total frequency by which either the annotated query or the query category occurs. Low-ranking rules may be discarded, and the high-ranking rules may be tested for accuracy on a new set of labeled queries.

In one embodiment, a rule is of the following form: "If a query matches the annotated query, '<ENTITY CATEGORY> KEYWORD TEXT,' then categorize the query into QUERY CATEGORY." Once the rule is created, the rule may be automatically applied to labeled queries or unlabeled queries. When applied to unlabeled queries, the rule is used to predict the query category that should categorize the query. When applied to labeled queries, the rule is used to correct queries that have been incorrectly labeled. Alternately, labeled queries can be used to test and modify the accuracy value for the rule.

The automatic query categorization technique described herein makes use of various methods described in "System For Resolving Entities In Text Into Real World Objects Using Context," U.S. application Ser. No. 12/251,146 ("parent application"), filed Oct. 14, 2008, the entire contents of which have been incorporated by reference as if fully set forth herein. The parent application describes a method for detecting an entity in text and associating that entity with a real world object identified by an object identifier. The parent application then describes how to categorize the object identifier.

Generating a List of Entities

There are numerous techniques that can be used to detect keywords in text. A first technique involves detecting the words that are capitalized in the text. The capitalized words are deemed to be keywords. A second technique involves detecting the words that appear in a dictionary or word list. The second technique is advantageous because the word list may be customized. In one embodiment, the word list is a list of entities, where each entity is mapped to an object identifier that identifies a real world object.

Each entry, or entity text, in the list of entities is generated from one or more of a number of sources. Click logs from a search engine show queries that users have sent, search engine results for the queries, and to which pages users navigated. For example, a users who searched for "The Dark Knight" navigated to the Wikipedia® page identified as "The_Dark_Knight_(film)" 30% of the time, to the Internet Movie Database® ("IMDB®") page identified as "tt0468569" (the movie, "The Dark Knight") 50% of the time, and to other sites 20% of the time. Because the Wikipedia® page identified as "The_Dark_Knight_(film)" identifies the IMDB® page "tt0468569" in the "External links" section, clicks to both the IMDB® "tt0468569" page and the Wikipedia® "The_Dark_Knight_(film)" page can be attributed to the same object. For simplicity, that object can be identified using the Wikipedia ID "The_Dark_Knight_(film)." Accordingly, the click logs would show an 80% degree of confidence that a user typing "The Dark Knight" refers to the object identified as "The_Dark_Knight_(film)." If the degree of confidence passes an entity-to-object threshold, then the entity text, "The Dark Knight" can be mapped to the object ID "The_Dark_Knight_(film)" and stored in the list of entities.

Entities are also generated from link graphs. Search engines use link graphs to rank pages. Pages that are most frequently linked to by other pages receive higher ranks. In the Dark Knight example, links with the anchor text, "The Dark Knight," link to the IMDB® page identified as "tt0468569" 40% of the time, to the Rotten Tomatoes® page identified as "the_dark_knight" 30% of the time, to the Wikipedia® page identified as "The_Dark_Knight_(film)" 20% of the time, and to other pages 10% of the time. As discussed, the IMDB® page identified as "tt0468569" is associated with the Wikipedia® page identified as "The_Dark_Knight_(film)" via the "External links" section. Similarly, the Rotten Tomatoes® page identified as "the_dark_knight" is associated with the Wikipedia® page identified as "The_Dark_Knight_(film)." Accordingly, Web sites linked to information about the same Dark Knight movie 90% of the time, indicating a 90% degree of confidence that a Web site linking to "The Dark Knight" referred to the object identified as "The_Dark_Knight_(film)." In the example, the entity text, "The Dark Knight," is mapped to object ID "The_Dark_Knight_(film)."

Redirect lists are managed by online service providers in order to direct a user to a target page from another page. Redirect lists can also be used to expand the list of entities. For example, if the user navigates to the Wikipedia® page identified as "Dark_Knight_(film)" instead of "The_Dark_Knight_(film)," then the user is redirected by Wikipedia® to "The_Dark_Knight_(film)" based in part on the editorial management of a redirect list. Similarly, if the user navigates to "The_Dark_Knight_(movie)," the user is also directed to "The_Dark_Knight_(film)." Underscores and parenthesis can be removed from the Wikipedia IDs when adding to the list of entities. For example, "Dark Knight film," "The Dark Knight movie," and "The Dark Knight film" can be added as entity texts that all refer to "The_Dark_Knight_(film)."

A disambiguation list can also be used to generate entities for the list of entities. Disambiguation lists are lists of pages that are suggested to a user when the user submits a query. For example, if the user submits "Dark Knight" to Wikipedia®, then the user is provided with a disambiguation list that includes "The_Dark_Knight_(film)" at the top of the list based in part on the editorial management of a disambiguation list. Accordingly, the disambiguation list indicates that entity text "Dark Knight" would map to "The_Dark_Knight_(film)."

An object list can be used to generate entities for the list of entities. For example, a Wikipedia object list includes "The_Dark_Knight_(film)." Unique substrings of the object identifier, such as "The Dark Knight," "Dark Knight film," and "The Dark Knight film," can be used to generate entities for the entity list. Non-unique substrings, such as "Knight," would not be mapped to the object identified as "The_Dark_Knight_(film)." Instead, the non-unique substring "Knight" would be mapped to the object identified as "Knight," which better matches the substring.

Detecting an Entity in a Query

Once the list of entities is generated, detecting entities in a text is simple. The text is compared with the list of entities. If a particular entity text matches the text or a substring of the text, then the particular entity text is identified as an entity. A query is a text inputted by a user that may contain one or more entity texts. Each entity text is detected from the list of entities.

Some entity texts may be overlapping. For example, the entity texts "Knight" and "The Dark Knight" are overlapping. There are many different techniques that could be used to resolve overlapping entity texts. For example, either the entity that starts first or the longest entity could be used, discarding the other overlapping entities. In one embodiment, the most popular entity, which is determined by the click logs, link graphs, redirect lists, disambiguation lists, and object lists, is used, discarding the other overlapping entities. For simplicity, though, the entity text to be used can simply be the longest entity text, giving preference to the leftmost entity in case of a tie in entity length.

Referring to FIG. 1A, a user submits query 101, which is logged in a query log. Word detection module 102 reads query 101 and compares query 101 to words in word list 104. Word list 104 is a list of entity texts. Entity text 103 is detected from query 101 as text that matches an entry in word list 104.

Determining an Object that Represents the Entity

As discussed above in "GENERATING A LIST OF ENTITIES," and as described in "System For Resolving Entities In Text Into Real World Objects Using Context," U.S. applicaiton Ser. No. 12/251,146, filed Oct. 14, 2008, the entire contents of which have been incorporated by reference as if fully set forth herein, entity text is then mapped to an object identifier using one or more of a variety of sources. The object identifier identifies a real world object to which various keywords and information may refer. For example, "The_Dark_Knight_(film)" identifies a Wikipedia® page that presents information about the film, The Dark Knight. The object identifier, "The_Dark_Knight_(film)," is also associated with information from IMDB® ID "tt0468569" and Rotten Tomatoes® ID "the_dark_knight," as described above in "GENERATING A LIST OF ENTITIES." Various keywords, such as "Dark Knight," "The Dark Knight," "Dark Knight movie," and "Dark Knight film," all refer to the object ID "The_Dark_Knight_(film)."

In FIG. 1A, entity resolver 106 uses entity resolver sources 105 such as click logs, link graphs, redirect lists, disambiguation lists, and object lists to determine an object ID 107 for entity text 103. Alternately, the entity texts in word list 104 are mapped to object IDs upon creation of word list 104 based in part on entity resolver sources 105.

Categorizing the Object

Referring again to FIG. 1A, the Yet Another Great Ontology (YAGO) system can be used as classifier 108 to map an object identifier 107 to an entity category 109. The YAGO ontology is accessible through a URL. Alternately, the YAGO ontology can be downloaded for more efficient and reliable access. The YAGO ontology categorizes Wikipedia page names, or object identifiers. A more detailed description of the YAGO ontology is found in Suchanek, F. M., Kasneci, G. & Weikum, G., "YAGO: A Core of Semantic Knowledge—Unifying WordNet and Wikipedia®," The 16th International World Wide Web Conference, Semantic Web: Ontologies Published by the Max Planck Institut Informatik, Saarbrucken, Germany, Europe (May 2007), which has been incorporated by reference in its entirety.

The YAGO ontology utilizes Wikipedia® category pages, which list Wikipedia® object identifiers that belong to the category pages. For example, "The_Dark_Knight" can be identified as a film because it belongs to the "2008_in_film" category page. In YAGO, the Wikipedia® categories, like other object identifiers, are stored as entities. A relationship is created between non-category Wikipedia® entities ("individuals") and category Wikipedia® entities ("classes"). For example, YAGO stores an entity, relation, entity triple ("fact") as follows: "The_Dark_Knight TYPE film." Wikipedia® categories alone do not yet provide a sufficient basis for a well-structured ontology because the Wikipedia® categories are organized based on themes, not based on logical relationships. See Suchanek, et al.

Unlike Wikipedia®, WordNet® provides an accurate and logically structured hierarchy of concepts ("synsets"). A synset is a set of words with the same meaning. WordNet® provides a hierarchical structure among synsets where some synsets are sub-concepts of other synsets. WordNet® is accurate because it is carefully developed and edited by human beings for the purpose of developing a hierarchy of concepts for the English language. Wikipedia®, on the other hand, is developed through a wide variety of humans with various underlying goals. See Suchanek, et al.

To take advantage of the hierarchical structure in WordNet®, the YAGO ontology maps Wikipedia® categories to YAGO classes. Various techniques for mapping Wikipedia® categories to YAGO classes are described in Suchanek, et al. In one embodiment, the YAGO ontology exploits the Wikipedia® category names. Wikipedia® category names are broken down into a pre-modifier, a head, and a post-modifier. For example, "2008 in film" would be broken down into "2008 in" (pre-modifier) and "film" (head). If WordNet® contains a synset for the pre-modifier and head, then the synset is related to the category. If not, a synset related to the head is related to the category. If there is no synset that matches the pre-modifier and head or the head alone, then the Wikipedia® category is not related to a WordNet® synset. In the example, the head of the category matches the synset "film" as follows: "2008 in film TYPE film." By classifying "2008 in film" as "film," YAGO can determine that "The_Dark_Knight_(2008)" is a "film."

In one embodiment, an object ID is mapped to more than one category. For example, "The_Dark_Knight_(2008)" may be categorized under "film" and "superhero." Optionally, a separate annotated query may be generated for each category. In another embodiment, the entity categories can be combined into a entity category placeholder that refers to both entities. The placeholder may, for example, be of the form: <<film><superhero>>. In yet another embodiment, the least common or worst fitting category is ignored. If, for example, the classifier is 70% sure that "The_Dark_Knight_(2008)" fits under "superhero" and 80% sure that "The_Dark_Knight_(2008)" fits under "film," then "film" is used as the category.

Referring to FIG. 1A, classifier 108, which may be a YAGO classifier or any other system that classifies entities, maps object ID 107 to entity category 109. Entity category 109, detected entity 103, and query 101 are sent to annotated query generation module 110.

Generating an Annotated Query From a Query

A user submits a query as text. An entity text from a list of entities is detected in the query text. The entity text is mapped to an object identifier by the entity resolver, and the object identifier is mapped to an entity category using a classifier such as the YAGO classifier. In one embodiment, the entity text is mapped directly to an entity category. The entity category may be selected from a set of entity categories that have been associated with the list of entities by an editor. The query text, the entity text, and the entity category are used to generate an annotated query.

The annotated query can be any representation of the entity category and a part of the query text. The query text is separated into an entity text and a keyword text, where the keyword text is the remainder of the query text after the entity text is removed. In one embodiment, the annotated query is a tuple of the form (entity category, keyword text). In another embodiment, the annotated query is a marked up version of the query. The entity text in the query is replaced with a placeholder for any entity text in the entity category. In one example, a query of the form "ENTITYTEXT KEYWORDTEXT" is marked up as "<ENTITYCATEGORY> KEYWORDTEXT."

In one embodiment, only part of the keyword text is stored. A first part or a second part of the keyword text may be stored together, or one part could be discarded. Alternately, only a certain number of characters are used for the keyword text. Keyword text exceeding the certain number of characters is discarded.

Words from the keyword text may be replaced with wildcard placeholders. For example, the words "a," "an," and "the" may be replaced with wildcard placeholders. The words to be replaced are detected from a list of words, which may be a list of generic words that rarely affect the meaning of the query. For example, the keyword text may take the form: $K:=k_1 k_2 k_3$, where $k_n$ is part of keyword text K, and $k_1$ and $k_3$ are generic words to be replaced with wildcard placeholders. Keyword text with wildcard placeholders may take the form: $K':=*k_2*$, indicating that, to match K, any or no words can appear before or after keyword $k_2$. The full annotated query may take the form $Q':="<C_1>*k_2*$," where $<C_1>$ is an entity category placeholder in annotated query Q' with keyword text K'.

In one example, more than one entity text is detected in the query text. In one embodiment, a separate annotated query is generated for each entity text in the query text. In one example, if $Q:=q_1 q_2 q_3$, where $q_n$ is part of query text Q. If $q_1$ and $q_3$ represent entities, then $q_1$ and $q_3$ are detected as entity texts $E_{q1}$ and $E_{q3}$. Entity text $E_{q1}$ maps to entity category $C_{q1}$ and $E_{q2}$ maps to entity category $C_{q2}$. Two annotated queries are generated, which may take the form: $Q_1':="<C_{q1}>q_2 q_3$," and $Q_2':="q_1 q_2<C_{q3}>$."

In another embodiment, a single annotated query contains entity category placeholders for each entity text detected in the query text. The single annotated query may take the form: $Q':="<C_{q1}>q_2<C_{q3}>$." In tuple form, the annotated query appears as follows ($C_{q1}$, $q_2$, $C_{q3}$), or alternately as (c: $C_{q1}$, k: $q_2$, c: $C_{q3}$)," where c represents a category information and k represents keyword information. The annotated query may be stored in any manner that allows the entity category or categories and keyword text(s) to be identified. In one embodiment, the order of keyword text and categories in the tuple is not relevant in determinations that are made based on the tuple. In another embodiment, the order of the keyword text and categories are preserved from the query.

Referring to FIG. 1A, annotated query generation module 110 receives query 101, detected entity 103, and entity category 109. Annotated query generation module 110 produces annotated query 111. Annotated query generation module 110 also computes a total count 112 of queries 101s in the query log of the same form as annotated query 111. In one embodiment, annotated query generation module 110 increments a counter for annotated query 111 to produce annotated query count 112. The components within the dotted line in FIG. 1A are the components of keyword categorizer 113, which takes as input query 101 and outputs annotated query 111 and annotated query count 112.

FIG. 1B illustrates an example of generating an annotated query from a query. Word detection module 102 looks for entity text in query text "britney spears shoot" 101. Word detection module 102 finds "britney spears" in word list 104 and query 101. Word detection module sends the detected entity text "britney spears" 103 to entity resolver 106. Entity resolver 106 resolves entity text "britney spears" 103 into object ID "Britney_Spears" 107. Classifier 108 classifies object ID "Britney_Spears" 107 into entity category "Celebrity" 109. Annotated query generation module 110 uses query 101, entity text 103, and entity category 109 to generate annotated query "<Celebrity> shoot" 111. From query "britney spears shoot" 101, entity text "britney spears" 103 is replaced with a category placeholder that matches any entity text of entity category "Celebrity" 109. Annotated query count 112 is incremented from 0 to 1, indicating that this is the first time that annotated query "<Celebrity> shoot" 111 has been detected in queries 101s from the query logs. In one embodiment, annotated query count 112 represents the total query count for queries 101s that match annotated query 111. In another embodiment, annotated query count 112 represents the unique query count that indicates the number of unique queries 101s that match annotated query 111. For example, queries "britney spears shoot" and "dick cheney shoot" both match annotated query "<Celebrity> shoot." If "britney spears shoot" occurs twice in queries 101s and "dick cheney shoot" occurs once in queries 101s, then the total query count is 3 and the unique query count is 2.

Figure 1C:
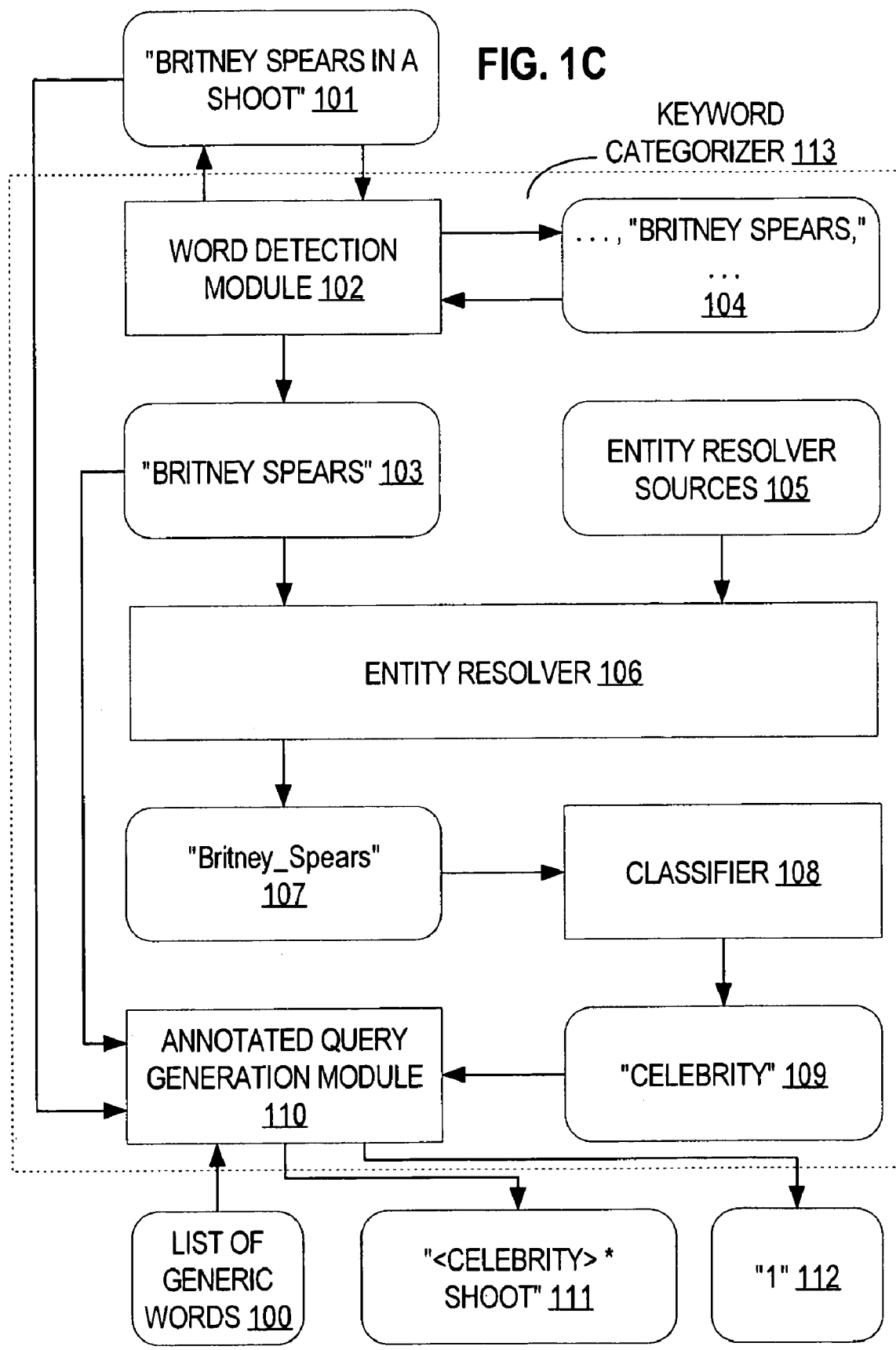

FIG. 1C illustrates an example of replacing generic words with wildcard placeholders in the annotated query. Entity text "britney spears" 103 is detected from query text "britney spears in a shoot" 101. Entity text 103 is resolved into object ID "Britney_Spears" 107, which is classified as "Celebrity" 109. Annotated query generation module 110 separates query 101 into entity text "britney spears" and keyword text "in a shoot." Annotated query generation module 110 replaces entity text 103 in query 101 with a placeholder for any entity matching entity category 109. Annotated query generation module uses list of generic words 100 to replace generic words "in" and "a" in query 101 with wildcard placeholder "*." Annotated query 111 "<Celebrity> * shoot" is generated from both the entity text replacement and generic word replacement.

FIG. 1D illustrates an example of generating an annotated query when two entity texts are detected in the query. Entity texts "The Dark Knight" and "IMAX" 103s are found in query "Watch The Dark Knight at the IMAX" 101 and word list 104. Entity text "The Dark Knight" 103 is resolved into object ID "The_Dark_Knight_(film)" 107, and entity text "IMAX" 103 is resolved into object ID "IMAX" 107. Object ID "The_Dark_Knight_(film)" is classified as "Movie" 109, and Object ID "IMAX" is classified as "Theater" 109. Annotated query generation module 110 replaces entity text "The Dark Knight" 103 with a placeholder for any entity text in entity category "Movie" 109, and entity text "IMAX" 103 with a placeholder for any entity text in entity category "Theater" 109. Annotated query generation module 110 also replaces generic words "at" and "the" from list of generic words 100 with a wildcard placeholder. Annotated query 111 "watch <Movie> * <Theater>" is generated from the entity text replacements and generic word replacement.

Associating the Annotated Query to a Query Category

Annotated queries from the keyword categorizer are used on labeled queries, or queries already categorized with a query category, to determine annotated queries that frequently occur with query categories. A particular annotated query and a particular query category are determined to frequently occur together when a high count of queries labeled with the particular query category match the particular annotated query (absolute frequency), and/or a high percentage of queries labeled with the particular query category match the particular annotated query (frequency relative to query category count), and/or a high percentage of labeled queries that match the particular annotated query are categorized using the particular query category (frequency relative to annotated query count).

In one embodiment, uncommon and/or unreliable annotated queries are removed from a set of annotated queries before determining which query categories are associated with the set of annotated queries. Annotated queries are uncommon when few of the annotated queries are detected from the query logs. Alternately, annotated queries may be uncommon when few unique queries (indicated by the unique query count) representing the annotated query are detected from the query logs. Uncommon annotated queries are removed because there is little chance of learning any valuable association between the uncommon annotated queries and query categories.

For example, if random keyword text such as "yqwoie" is detected a few times with queries that are labeled with the same query category, then this may cause a rule to be created that associates the annotated query containing the nonsense keyword "yqwoie" with the query category. Such a relationship would be based on a random coincidence. Removing uncommon annotated queries will reduce the likelihood that annotated queries with nonsense keywords are generated.

Annotated queries are unreliable when the annotated query occurs relatively infrequently compared to the number of times either the entity category occurs and/or the keyword text occurs. Unreliable annotated queries are removed because the co-occurrence of unreliable annotated queries with query categories may be misleading. For example, suppose three queries "the aacc," "the ais," and "the atc," occur in the query logs. Each of these queries would match an annotated query of the format "the <CompanyTickerSymbol>," because "aacc," "ais," and "atc" are company ticker symbols for Asset Acceptance Capital Corp. (NASDAQ), Antares Pharma, Inc. (AMEX), and Cycle Country Accessories Corp. (AMEX), respectively. However, the actual queries might very well refer to the Anne Arundel Community College ("aacc"), the Association for Information Systems ("ais"), and the Advanced Technology College ("atc"), respectively. The annotated query "the <CompanyTickerSymbol>" will be considered unreliable due to the large number of queries containing the keyword "the" and/or the large number of queries containing an entity in the entity category CompanyTickerSymbol. Particularly, the "the <CompanyTickerSymbol>" occurs relatively infrequently compared to the number of times "the" occurs and/or the number of times <CompanyTickerSymbol> occurs. A rule created based on the unreliable annotated query "the <CompanyTickerSymbol>" would potentially create a misleading association between the annotated query and the query category.

Figure 2A:
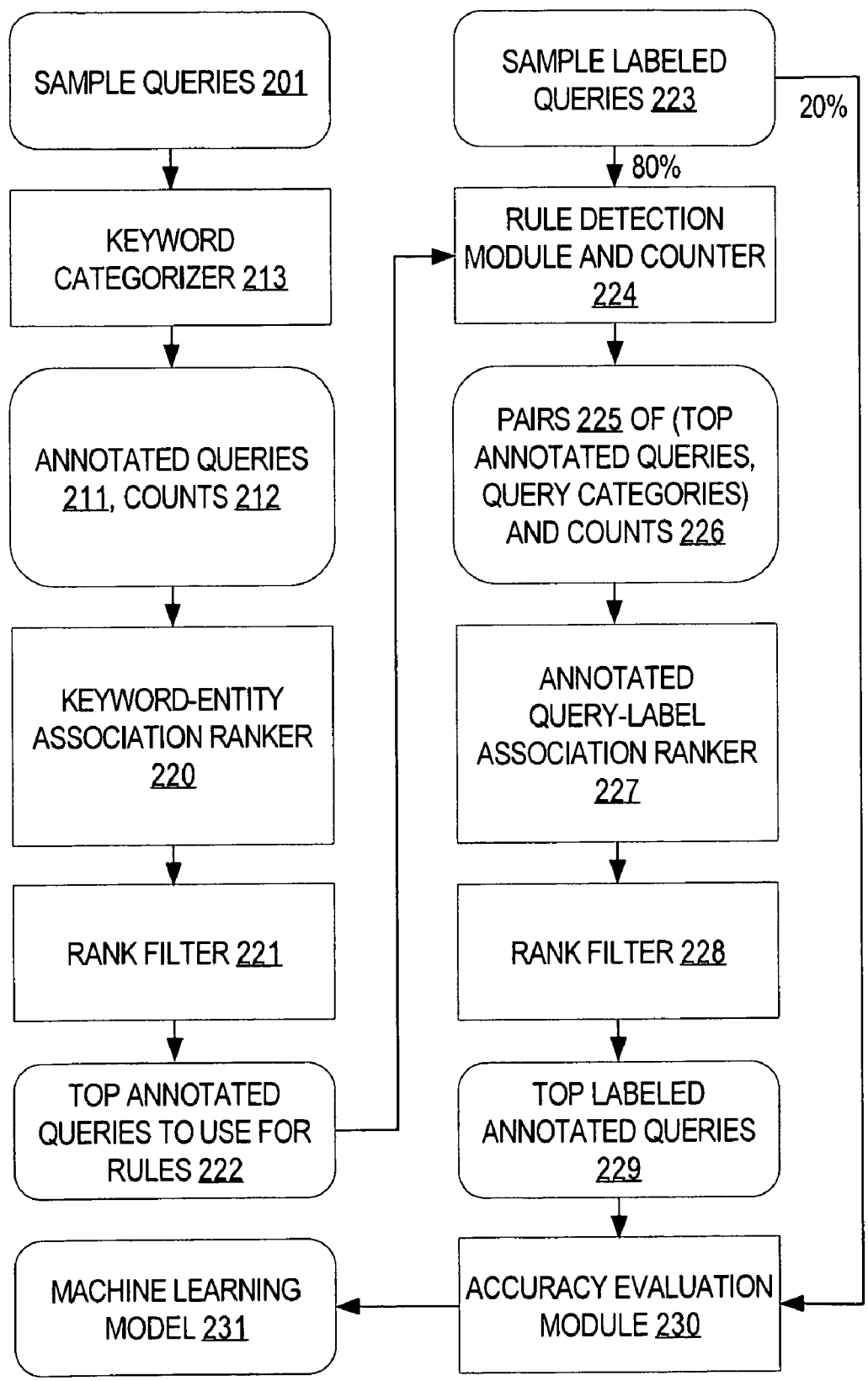
FIGS. 2A and 2B are diagrams illustrating techniques and examples for generating rules based on associations between common query patterns and query categories.

The process of creating a rule from an annotated query is illustrated in FIG. 2A. Sample queries 201 are sent to keyword categorizer 213, which determines a set of annotated queries 211 and counts 212 as shown in more detail in FIG. 1A. Keyword-entity association ranker 220 ranks annotated queries 211 using counts 212. In one embodiment, uncommon annotated queries are ranked lower than common annotated queries. Optionally, unreliable annotated queries are ranked lower than reliable annotated queries.

In one embodiment, annotated queries are ranked in, for example, a hundred buckets, labeled from 1 to 100. Optionally, two sets of buckets are used, one set based on how frequently an annotated query occurs (set of count buckets), and one set based on how frequently the annotated query occurs relative to the frequency by which either the entity category and/or the keyword text occurs (set of weight buckets). The annotated queries are evenly distributed among the count buckets, with the least commonly occurring annotated queries placed in the lower count buckets, and the most commonly occurring annotated queries placed in the higher count buckets. The annotated queries are also evenly distributed among the weight buckets, with the least reliable annotated queries placed in the lower weight buckets, and the most reliable annotated queries placed in the higher weight buckets. In one embodiment, the weight bucket for an annotated query is determined by a combination of any of P((entity category)|(keyword text)), P((keyword text)|(entity category)), and M(entity category, keyword text), where M(entity category, keyword text)=P(entity category & keyword text)/(P(entity category)*P(keyword text)), and $P(x|y)$ is the probability that x occurs given y.

In one embodiment, the lowest bucket from either bucket category is chosen as a bucket value for each annotated query 211. Annotated queries 211 with bucket values above a given threshold are selected in rank filter 221 as top annotated queries to use for rules 222. In one embodiment, annotated queries with either a count bucket value or a weight bucket value of 10 or less are filtered out of annotated queries 211 to create a set of top annotated queries 222. Although one technique is listed here for ranking and filtering annotated queries (a pair of entity text and keyword text), a person skilled in the art would know several alternate techniques for ranking and filtering a pair of items based on counts.

In one embodiment, 80% of sample labeled queries 223 are used to generate rules, leaving 20% of sample labeled queries to be used for evaluating rule accuracy. To generate the rules, sample labeled queries 223 are mapped to labeled annotated queries in the same manner that keyword categorizer 213 mapped sample queries 201 to annotated queries 211. The labeled annotated queries are compared to top annotated queries 222 to determine whether the labeled annotated queries match any top annotated queries 222. In one embodiment, a list of bits is used for each labeled query, where each bit in the list refers to one of top annotated queries 222. A bit is stored as "1" if the corresponding annotated query matches the labeled query. A bit is stored as "0" if the corresponding annotated query does not match the labeled query. Rule detection module 224 stores pairs 225 of query categories of labeled queries 223 and top annotated queries 222, for labeled queries 223 that matched the form of top annotated queries 222. Rule detection module 224 also stores counts 226 that the (annotated query, query category) pairs occurred.

Annotated query-label association ranker 227 works in a similar manner to keyword-entity association ranker 220, except that the input to annotated query-label association ranker 227 is (annotated query, query category) pairs instead of (entity category, keyword) pairs. If a particular annotated query commonly occurs with a particular query category, then the pair of the particular annotated query and particular query category will receive a high count ranking. An (annotated query, query category) pair is uncommon when the pair occurs relatively infrequently. If a particular annotated query reliably occurs with a particular query category, then the pair of the particular annotated query and particular query category will receive a high weight ranking. An (annotated query, query category) pair is unreliable when the pair occurs relatively infrequently compared to the number of times either the annotated query occurs and/or the query category occurs. In one embodiment, the count bucket for a pair is determined by N(annotated query & query category), where N is the absolute frequency. The weight bucket for the pair is determined by a combination of any of P((annotated query)| (query category)), P((query category)|(annotated query)), and M(annotated query, query category), where P(x|y) is the probability that x occurs given y, and M(annotated query, query category)=P(annotated query & query category)/(P(annotated query)*P(query category)).

In one embodiment, the lowest bucket from either bucket category is chosen as a bucket value for each pair of (annotated query, query category). Pairs with bucket values above a given threshold are selected in rank filter 228 to be used for rules as labeled annotated queries 229. In one embodiment, pairs 225 of (annotated query, query category) with either a count bucket value or a weight bucket value of 10 or less are filtered out to create a set of top labeled annotated queries 229. Although one technique is listed here for ranking and filtering pairs of (annotated query, query category), a person skilled in the art would know several alternate techniques for ranking and filtering a pair of items based on counts.

In one embodiment, 20% of sample labeled queries 223 are used to calculate the accuracy of the rules. The 20% of sample labeled queries 223 along with top annotated queries 229 are fed into accuracy evaluation module 230. Accuracy evaluation module 230 maps queries from sample labeled queries 223 to annotated queries from top labeled annotated queries 229. Some queries from sample labeled queries 223 may not match any annotated queries from top labeled annotated queries 229. The non-matching queries may be ignored. For sample labeled queries 223 that match annotated queries from top labeled annotated queries 229, the predicted query category from top labeled annotated queries 229 is compared to the actual query category from sample labeled queries 223. If the query categories match, then the rule was accurate in that instance. Rules from top labeled annotated queries 229 that frequently miscategorize the query (i.e., the query categories frequently do not match) can be filtered out by accuracy evaluation module 230.

Figure 2B:
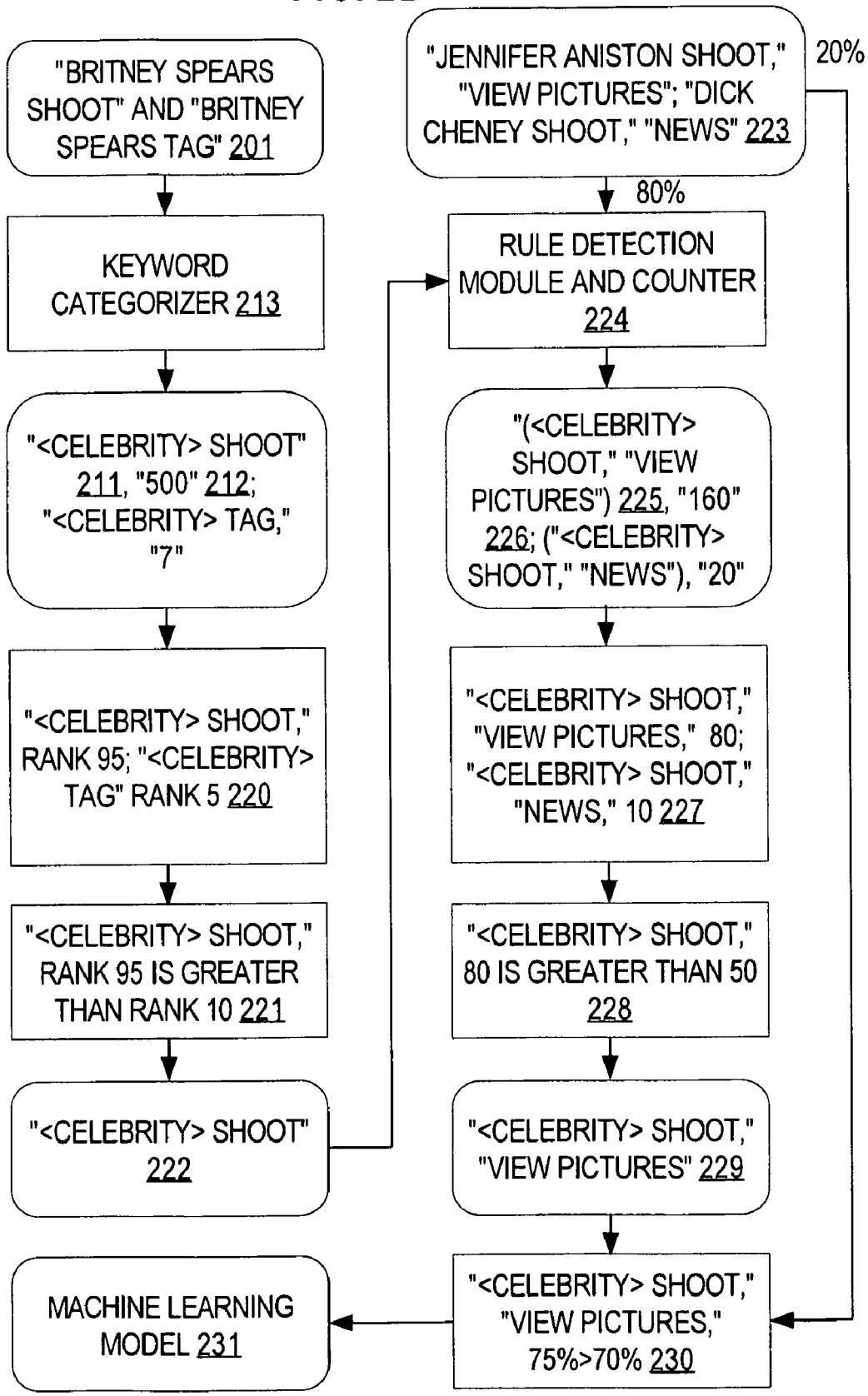

FIG. 2B illustrates an example of determining an annotated query that is associated with a query category. Two queries, "britney spears shoot" and "britney spears tag," of sample queries 201 are mapped to annotated queries 211 by keyword categorizer 213. The query "britney spears shoot" is mapped to annotated query "<Celebrity> shoot" a total of 500 times (item 212 in FIG. 2B), and the query "britney spears tag" is mapped to annotated query "<Celebrity> tag" a total of 7 times. Association ranker 200 assigns the annotated query "<Celebrity> shoot" a rank of 95 and the annotated query "<Celebrity> tag" a rank of 5 based partly on counts 212. Rank filter 221 with a threshold of 10 filters out the "<Celebrity> tag" annotated query with a rank of 5, but "<Celebrity> shoot" passes the threshold value and becomes a top annotated query 222.

Labeled queries ("jennifer aniston shoot," "view pictures") and ("dick cheney shoot," "news") 223 are retrieved, for example, from a third party that uses "view pictures" and "news" as query categories. Labeled queries 223 are compared to top annotated queries 222 to determine whether any of labeled queries 223 are of the same form as top annotated queries 222. Rule detection module 224 determines that annotated query "<Celebrity> shoot" occurred with the "view pictures" query category in 160 (item 226 in FIG. 2B) of the queries in labeled queries 223. The ("<Celebrity> shoot," "news") pair 225 occurred 20 times.

Association ranker 227 assigns a rank to each pair 225 based in part on the counts 226. A rank value of 80 is assigned to the ("<Celebrity> shoot," "view pictures") pair, and rank value of 10 is assigned to the ("<Celebrity> shoot," "news") pair. Low ranking pairs are filtered out by rank filter 228 using a similar filtering technique as is described for rank filter 221. Top labeled annotated queries 229 remain to be used as rules once the low ranking pairs are filtered out.

In the example shown, 20% of sample labeled queries 223 are used to check the accuracy of top labeled annotated queries 229. Accuracy evaluation module 230 maps sample labeled queries 223 to matching top labeled annotated queries 229 in order to determine a predicted query category for sample labeled queries 223. If the predicted query category matches the query category stored for sample labeled queries 223, then the rule performed accurately. If the predicted category does not match, then the rule performed inaccurately. Accuracy evaluation module 230 updates machine-learning model 231 with information about which rules remain accurate.

A person of ordinary skill would know of several ways to calculate accuracy that vary from FIG. 2A. For example, one could use a k-fold cross validation approach to test the accuracy of the system. With the k-fold cross validation approach, one would divide sample labeled queries 223 into k sets and re-run the program k times, each time using one of the k sets to calculate the accuracy of the system and the other k−1 sets to generate rules (the k−1 sets being sent to rule detection module and counter 224). The average accuracy value for k runs is calculated for each rule. Other known techniques would lead to various other divisions of sample labeled queries 223 into different data sets in order to both generate the rules and test them. Using 80% of sample labeled queries 223 to generate the rules and 20% of sample labeled queries to test the rules is one straightforward and simple approach provided for illustration.

Accuracy evaluation module 230 compares the accuracy value to a threshold accuracy value. For example, if the threshold accuracy value is 70%, then the ("<Celebrity> shoot," "view pictures") pair, for example, 75% accurate, meets the threshold. If the threshold accuracy value is 80%, then the pair does not meet the threshold. If the pair meets the threshold, then, in one embodiment, the top labeled annotated query 229 alone can be used to automatically categorize unlabeled queries or correct labeled queries that have been incorrectly categorized. In another embodiment, as shown, accuracy evaluation module 230 updates machine learning model 231 with top labeled annotated query 229 that passes accuracy evaluation module 230.

In other words, there are two ways to predict a query category for an unlabeled query: (1) by training a machine learning model and using it to classify the queries, and (2) by using the rules and their accuracy values directly to do the prediction. A person skilled in the art can determine what type of machine learning system to use. For example, one could build a decision tree classifier, a logistic regression classifier, a maximum entropy classifier, a neural network classifier, or a Bayesian network classifier. In one embodiment, one would use a combination of multiple different classifiers to classify the incoming query.

Automatically Categorizing a Query

Once a common and reliable set of (annotated query, query category) pairs have been determined, the process of automatically categorizing a query involves matching the query to an annotated query and selecting the query category associated with the annotated query in the pair. In one embodiment, if the query matches more than one annotated query, then the query is categorized by the query category of the best matching annotated query. In another embodiment, the system will look at all of the annotated queries that match the query to retrieve the associated categories and accuracies for those annotated queries and use this information to determine how the query should be categorized. For example, suppose a query matches annotated queries A, B, and C, where A is associated with query category C1 with 80% accuracy, and B and C are associated with category C2 with 70% accuracy each. Although annotated query A has the highest accuracy value, we can combine the score of annotated queries B and C and end up with, for example, an accuracy value of 85% that the query fits in category C2.

In one embodiment, if the query matches two annotated queries that each map to the same query category, then the accuracy value of one or both of the pairs is increased. In another embodiment, if the query matches two annotated queries, the first annotated query in a first pair with a first query category and the second annotated query of in a second pair with a second query category, then the accuracy value of one or both of the pairs is decreased. Optionally, the query is categorized by a new accuracy value without modifying the accuracy value of any of the pairs.

The automatic query categorization system can also be used to find labeled queries that have been categorized incorrectly. For example, if the labeled query matches a rule with a very high accuracy value, then the automatic query categorization system can be used to accurately predict the query category. If the query category of the labeled query does not match the query category predicted by the automatic query categorization system, then the query category of the labeled query can be changed to the predicted query category. In one embodiment, the query category of the labeled query is flagged so that a human user can review the labeled query to make a determination of whether to change the query category of the labeled query. In another embodiment, the query category of the labeled query is changed automatically if the predicted query category has an accuracy value above a threshold accuracy value.

Although the goal of the automatic query categorization system is to mimic an existing query categorizer, the automatic query categorization system will in many cases have a higher accuracy than the original system. In a sample implementation, the original query categorization system had 58% accuracy, while the automatic query categorization system achieved 83% accuracy. The automatic query categorization system basically "mimicked" the original system but avoided mimicking many of the erroneously categorized queries.

Figure 3A:
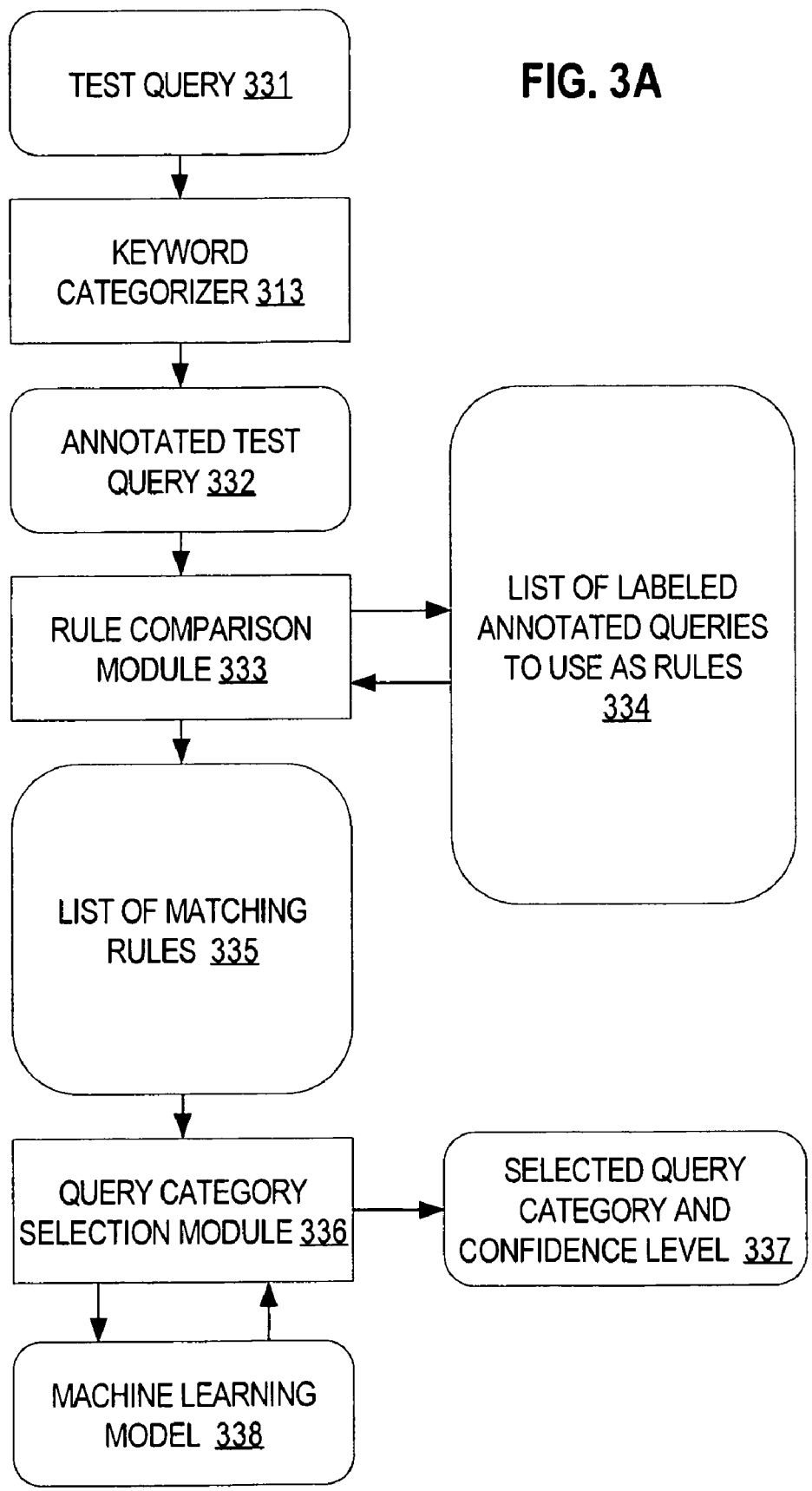
FIGS. 3A through 3C are diagrams illustrating techniques and examples for categorizing a query based on rules that specify the types of queries that belong to particular query categories.

Referring to FIG. 3A, test query 331 is sent to keyword categorizer 313 to produce annotated test query 332. Rule comparison module compares annotated test query 332 with each annotated query in a list of labeled annotated queries 334. If the annotated test query matches any of the labeled annotated queries of the list of labeled annotated queries 334, then the labeled annotated query is added to the list of matching rules 335. In one embodiment, the list is stored as a bit-vector, where a bit value of "1" is stored for matching rules and "0" for non-matching rules. Query category selection module 336 looks up the annotated queries from the list of matching rules 335 in the machine learning model 338. If only one labeled annotated query is in list 335, then query category selection module 336 selects the query category of the labeled annotated query. In one embodiment, if more than one annotated query is in list 335, then query category selection module 336 selects the query category of the labeled annotated query or queries with the highest accuracy values according to machine learning model 338. Alternately, query category selection module 336 determines the query category based at least in part on a combination of accuracy values from annotated queries.

Query category selection module 336 can weigh rules in list 335 by positively combining accuracy values of rules that map to the same category. For example, suppose rules A, B, and C match the query. Rule A maps to query category X with an accuracy value of 85%, rule B maps to query category X with an accuracy value of 70%, and rule C maps to query category Y with an accuracy value of 55%. The machine-learning model stores a representation of rules A, B, and C. Query category selection module 336 uses the machine-learning model to determine that query category X is associated with the query by positively combining the query's associations with groups A and B to form a degree of confidence of, for example, 90%. In the example, the query is categorized in query category X with a degree of confidence of 90%, or another value based at least in part on the accuracy values.

Figure 3B:
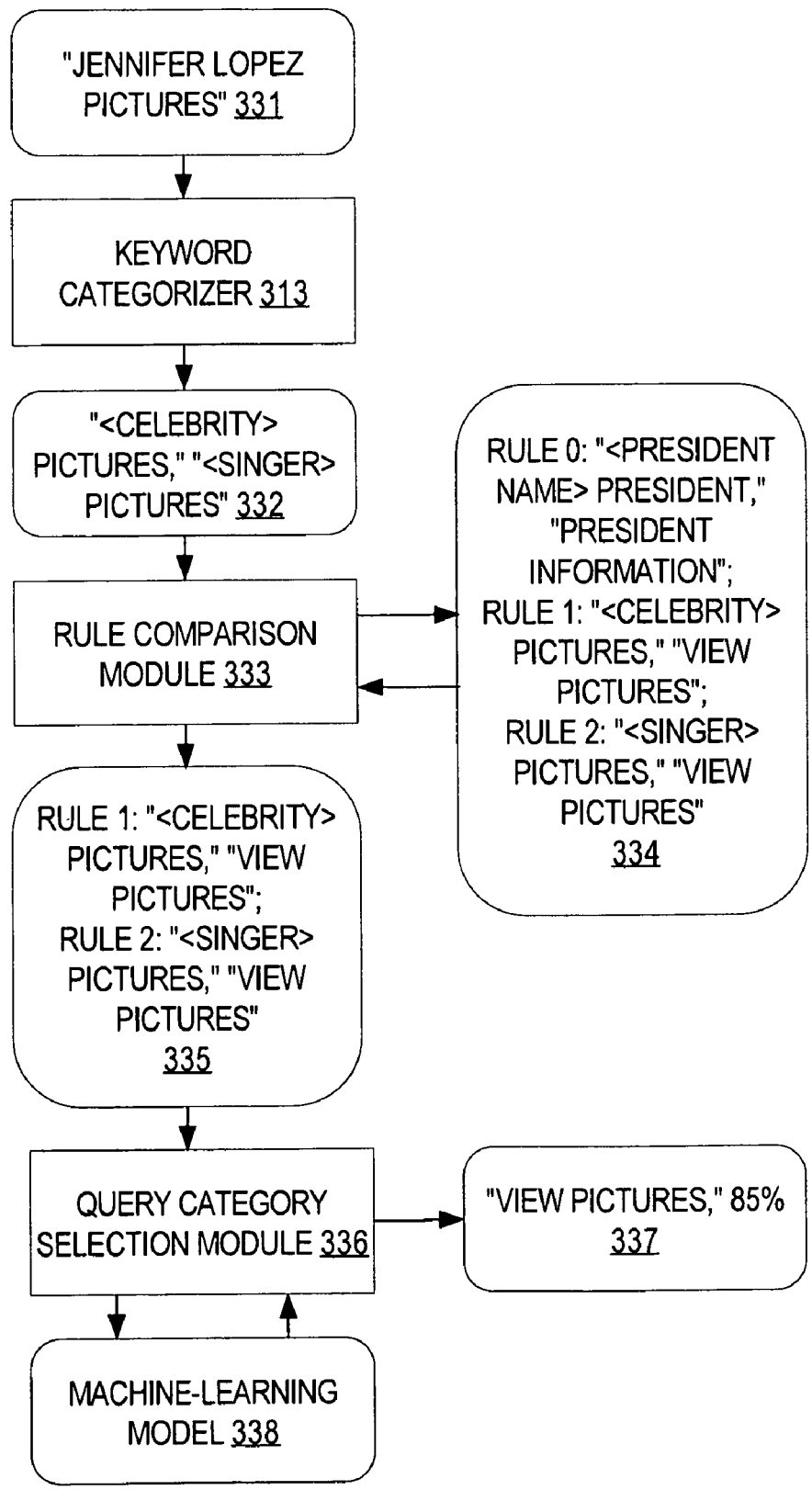

FIG. 3B illustrates an example of categorizing a query based on a list of rules when two rules suggest the same query category. The query "jennifer lopez pictures" 331 is mapped to two annotated queries 332 by keyword categorizer 313. The annotated queries, "<Celebrity> pictures" and "<Singer> pictures" are compared to list of rules 334 by rule comparison module 333. Two matching rules are found and listed in the list of matching rules 335. Rule 1 indicates that a query of the form "<Celebrity> pictures" belongs to query category "view pictures." Rule 2 indicates that a query of the form "<Singer> pictures" belongs to query category "view pictures." Query category selection module 336 determines that both rules suggest the same query category for query 331. Query 331 is categorized in the "view pictures" query category with a degree of confidence of, for example, 85%, determined from the machine-learning model based at least in part on a combination of the accuracy values for the annotated queries. The selected query category and degree of confidence 337 are stored.

Figure 3C:
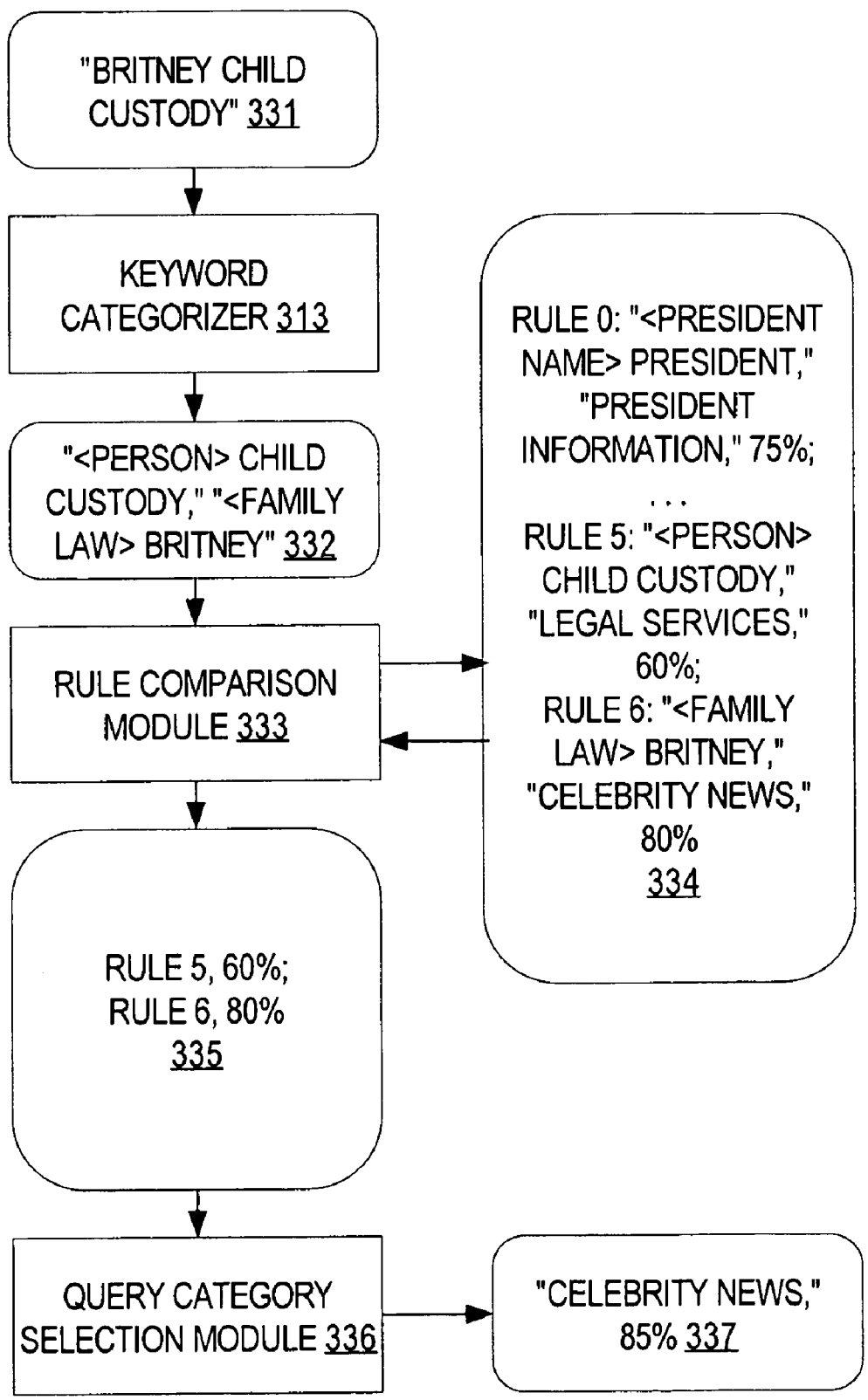

FIG. 3C illustrates an example of categorizing a query based on a list of rules when two rules suggest different query categories. The query "britney child custody" 331 is mapped to two annotated queries 332 by keyword categorizer 313. The annotated queries, "<Person> child custody" and "britney <Family Law>" are compared to list of rules 334 by rule comparison module 333. Rule 5, with query category "legal services," is selected, and Rule 6, with query category "celebrity news," is selected. Rules 5 and 6 are added to the list of matching rules 335. Query category selection module 336 determines that query category "celebrity news" best matches the query based at least in part on the accuracy values determined when creating Rules 5 and 6. Query 331 is categorized in the "celebrity news" query category (selected category 337) with a degree of confidence of, for example 85%.

Testing Categorized Queries

In one embodiment, accuracy values are updated by applying the rules to queries that have already been reliably categorized into query categories. Predicted categories from rules matching the queries are compared to the actual categories. If the categories match, then the accuracy value for the rule is increased. If the categories do not match, then the accuracy value for the rule is decreased.

Figure 4:
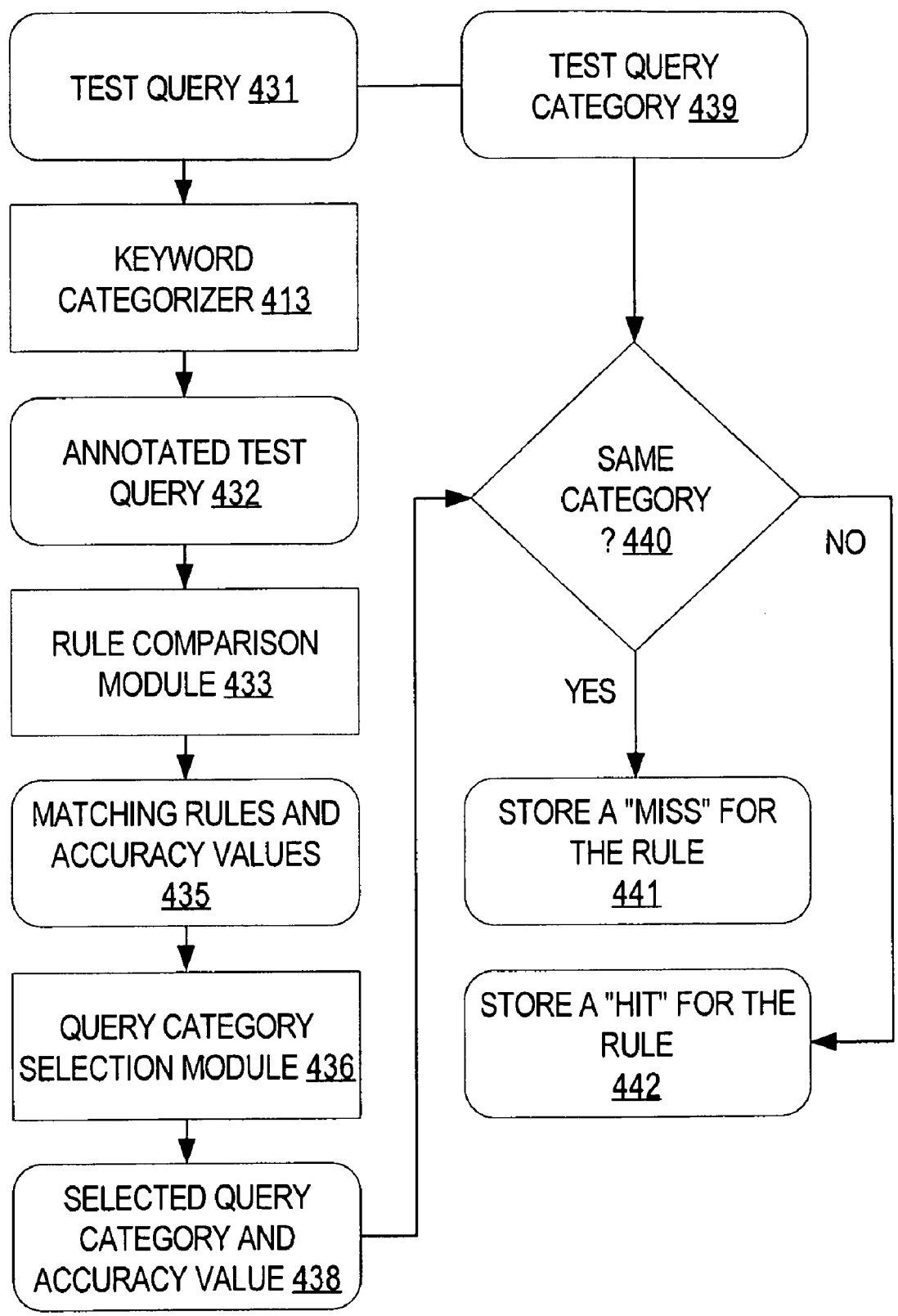
FIG. 4 is a diagram illustrating a technique for testing a rule that categorizes a type of query in a particular category.

FIG. 4 illustrates an example of modifying accuracy values based on information learned when categorizing queries. Test query 431 is mapped to annotated test query 432 by keyword categorizer 413. Rule comparison module 433 determines the matching rules and accuracy values 435 by comparing annotated test query 432 to a list of rules. Query category selection module 436 determines a selected query category and accuracy value 438 by weighing the matching rules and accuracy values 435. Test query category 439 is compared to the selected query category in step 440. If the query categories are the same, a hit is stored in step 441. If the query categories are different, a miss is stored in step 442. A log of hits and misses can be used to calculate accuracy values and update the machine learning model.

Hardware Overview

Figure 5:
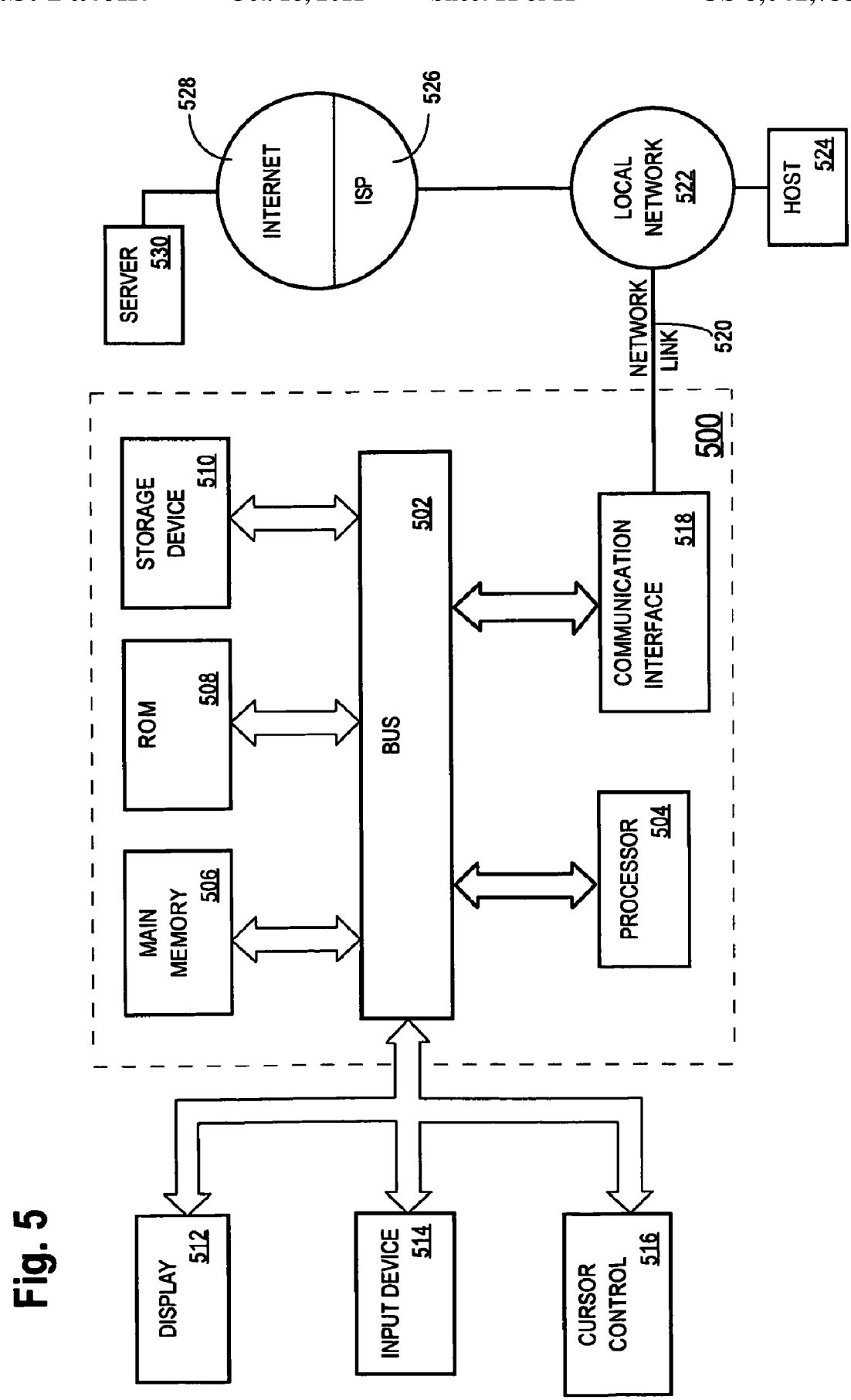
FIG. 5 is a diagram that illustrates a computer system that can be used for query categorization.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to storage media and transmission media. Storage media includes both non-volatile media and volatile media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
    determining that a first query is associated with a first query category;
    detecting a first entity text in the first query;
    mapping the first entity text to a first entity category at least partially in response to:
        (a) determining that the first entity text is among a plurality of entity texts that are mapped to an entity of a plurality of entities, wherein a plurality of other entity texts are mapped to a plurality of other entities of the plurality of entities, and
        (b) determining that the entity is mapped to the first entity category;
    determining a first keyword text that occurs in the first query in addition to the first entity text;
    determining that a second query comprises said first keyword text and a second entity text in said first entity category;
    based at least in part on said determining that the second query comprises said first keyword text and the second entity text in said first entity category, storing information that indicates that the second query is associated with said first query category;
    storing a plurality of annotated queries in association with a plurality of query categories, wherein each annotated query of the plurality of annotated queries comprises a pair of at least a keyword text and an entity category, and wherein each annotated query represents one or more queries of a set of queries;
    for each annotated query of the plurality of annotated queries, determining an accuracy value for the annotated query based at least in part on a frequency by which the annotated query refers to a query category associated with the annotated query relative to a number of times the annotated query occurs in the set of queries;
    selecting one or more annotated queries of the plurality of annotated queries based at least in part on the accuracy value determined for the one or more annotated queries;
    wherein the method is performed by one or more computing devices.

2. The method of claim 1, wherein the first query is one of a first set of queries, wherein the first query category is one of a set of query categories, wherein each particular query of the first set of queries is associated with a particular query category of the set of query categories; the method further comprising:
    for each particular query in the first set of queries:
    detecting a particular entity text in the particular query;
    mapping the particular entity text to a particular entity category by:
        determining that the particular entity text is among a plurality of entity texts mapped to a particular entity of the plurality of entities, and
        mapping the particular entity to the particular entity category;
    determining a particular keyword text that occurs in the particular query in addition to the particular entity text;
    storing, on a volatile or non-volatile computer readable storage medium, information that indicates that a particular annotated query comprising the particular keyword text and the particular entity category is associated with the particular query category.

3. The computer-implemented method of claim 1, further comprising:
    determining that a particular annotated query, comprising a particular keyword text and a particular entity category, represents queries that are frequently associated with a particular query category;
    storing, on the volatile or non-volatile computer-readable storage medium, a second information that indicates that any other query is associated with the particular query category when the other query comprises the particular keyword text and any entity text that is mapped to the particular entity category.

4. The computer-implemented method of claim 1, further comprising:
    for each annotated query of the plurality of annotated queries, ranking the annotated query based at least in part on a frequency by which the pair occurs in the set of queries; and
    selecting one or more annotated queries of the plurality of annotated queries based at least in part on the step of ranking.

5. The computer-implemented method of claim 1, further comprising:
    for each annotated query of the plurality of annotated queries, ranking the annotated query based at least in part on a frequency by which the annotated query occurs relative to a number of times that the entity category occurred in the set of queries; and
    selecting one or more annotated queries of the plurality of annotated queries based at least in part on the step of ranking.

6. The computer-implemented method of claim 1, further comprising:
    for each annotated query of the plurality of annotated queries, ranking the annotated query based at least in part on a frequency by which the annotated query occurs relative to a number of times that the keyword text occurred in the set of queries; and
    selecting one or more annotated queries of the plurality of annotated queries based at least in part on the step of ranking.

7. The computer-implemented method of claim 1, further comprising:
    for each annotated query of the plurality of annotated queries, ranking the annotated query based at least in part on a frequency by which the annotated query occurs in unique queries of the set of queries; and selecting one or more annotated queries of the plurality of annotated queries based at least in part on the step of ranking.

8. The computer-implemented method of claim 1, further comprising storing a particular annotated query by replacing the first entity text in the first query with a placeholder for any entity text in the first entity category.

9. The computer-implemented method of claim 1, further comprising:
detecting a word in the first query that belongs to a list of generic words; and
replacing the word with a placeholder for any keyword text.

10. The computer-implemented method of claim 1, wherein said entity is a first entity, the method further comprising:
detecting a third entity text in the first query;
mapping the third entity text to a second entity category at least partially in response to:
determining that the third entity text is among a plurality of entity texts that are mapped to a second entity of the plurality of entities, and
determining that the second entity is mapped to the second entity category;
wherein storing the information that indicates that the second query is associated with said first query category is further based at least in part on determining that the second query further comprises a fourth entity text in the second entity category.

11. The computer-implemented method of claim 10, further comprising storing a particular annotated query comprising the first entity category and the second entity category at least in part by:
replacing the first entity text in the first query with a first placeholder for any entity text in the first entity category; and
replacing the third entity text in the first query with a second placeholder for any entity text in the second entity category.

12. A computer-implemented method comprising:
receiving a query;
detecting a first entity text in the query;
mapping the first entity text to a first entity category at least partially in response to:
(a) determining that the first entity text is among a plurality of entity texts that are mapped to a first entity of a plurality of entities, wherein a plurality of other entity texts are mapped to a plurality of other entities of the plurality of entities, and
(b) determining that the first entity is mapped to the first entity category;
determining a first keyword text for the query;
detecting a second entity text in the query;
mapping the second entity text to a second entity category at least partially in response to:
(c) determining that the second entity text is among a plurality of entity texts that are mapped to a second entity of the plurality of entities, and
(d) determining that the second entity is mapped to the second entity category;
determining a second keyword text for the query;
determining that the query matches a first annotated query comprising the first entity category and the first keyword text, the first annotated query associated with a first query category;

determining a first accuracy value by which the first annotated query refers to the first query category relative to a first number of times the first annotated query occurs in a set of queries;
determining that the query matches a second annotated query comprising the second entity category and the second keyword text, the second annotated query associated with a second query category;
determining a second accuracy value by which the second annotated query refers to the second query category relative to a second number of times the second annotated query occurs in a set of queries;
determining whether the first query category matches the second query category;
in response to said determining that the first query category matches the second query category, determining a third accuracy value by which the query is associated with the first query category based at least in part on both the first accuracy value and the second accuracy value;
wherein the method is performed by one or more computing devices.

13. The computer-implemented method of claim 12, further comprising:
storing a list of bits for each query category in a set of query categories, the list of bits comprising at least one bit for each annotated query in a set of annotated queries;
in response to determining that the query matches the first annotated query, storing 1 in a first bit associated with the first annotated query in the list of bits; and
in response to determining that the query matches the second annotated query, storing 1 in a second bit associated with the second annotated query in the list of bits.

14. One or more non-transitory computer-readable storage media storing instructions, which when executed by one or more processors, cause the one or more processors to perform:
determining that a first query is associated with a first query category;
detecting a first entity text in the first query;
mapping the first entity text to a first entity category at least partially in response to:
(a) determining that the first entity text is among a plurality of entity texts that are mapped to an entity of a plurality of entities, wherein a plurality of other entity texts are mapped to a plurality of other entities of the plurality of entities, and
(b) determining that the entity is mapped to the first entity category;
determining a first keyword text that occurs in the first query in addition to the first entity text;
determining that a second query comprises said first keyword text and a second entity text in said first entity category;
based at least in part on said determining that the second query comprises said first keyword text and the second entity text in said first entity category, storing information that indicates that the second query is associated with said first query category;
storing a plurality of annotated queries in association with a plurality of query categories, wherein each annotated query of the plurality of annotated queries comprises a pair of at least a keyword text and an entity category, and wherein each annotated query represents one or more queries of a set of queries;
for each annotated query of the plurality of annotated queries, determining an accuracy value for the annotated query based at least in part on a frequency by which the annotated query refers to a query category associated with the annotated query relative to a total number of times the annotated query occurs in the set of queries;

selecting one or more annotated queries of the plurality of annotated queries based at least in part on the accuracy value determined for the one or more annotated queries.

15. The one or more non-transitory computer-readable storage media of claim 14, wherein the first query is one of a first set of queries, wherein the first query category is one of a set of query categories, wherein each particular query of the first set of queries is associated with a particular query category of the set of query categories; the instructions further causing the one or more processors to perform:

for each particular query in the first set of queries:
detecting a particular entity text in the particular query;
mapping the particular entity text to a particular entity category by:
determining that the particular entity text is among a plurality of entity texts mapped to a particular entity of the plurality of entities, and
mapping the particular entity to the particular entity category;
determining a particular keyword text that occurs in the particular query in addition to the particular entity text;
storing information that indicates that a particular annotated query comprising the particular keyword text and the particular entity category is associated with the particular query category.

16. The one or more non-transitory computer-readable storage media of claim 14, wherein the instructions further cause the one or more processors to perform:

determining that a particular annotated query, comprising a particular keyword text and a particular entity category, represents queries that are frequently associated with a particular query category;
storing a second information that indicates that any other query is associated with the particular query category when the other query comprises the particular keyword text and any entity text that is mapped to the particular entity category.

17. The one or more non-transitory computer-readable storage media of claim 14, wherein the instructions further cause the one or more processors to perform:

for each annotated query of the plurality of annotated queries, ranking the annotated query based at least in part on one or more of: (i) a first frequency by which the pair occurs in the set of queries, (ii) a second frequency by which the annotated query occurs relative to a number of times that the entity category occurred in the set of queries, (iii) a third frequency by which the annotated query occurs relative to a number of times that the keyword text occurred in the set of queries, or (iv) a fourth frequency by which the annotated query occurs in unique queries of the set of queries; and
selecting one or more annotated queries of the plurality of annotated queries based at least in part on the step of ranking.

18. The one or more non-transitory computer-readable storage media of claim 14, wherein the instructions further cause the one or more processors to perform storing a particular annotated query by replacing the first entity text in the first query with a placeholder for any entity text in the first entity category.

19. The one or more non-transitory computer-readable storage media of claim 14, wherein the instructions further cause the one or more processors to perform:

detecting a word in the first query that belongs to a list of generic words; and
replacing the word with a placeholder for any keyword text.

20. The one or more non-transitory computer-readable storage media of claim 14, wherein said entity is a first entity, and wherein the instructions further cause the one or more processors to perform:

detecting a third entity text in the first query;
mapping the third entity text to a second entity category at least partially in response to:
determining that the third entity text is among a plurality of entity texts that are mapped to a second entity of the plurality of entities, and
determining that the second entity is mapped to the second entity category;
wherein storing the information that indicates that the second query is associated with said first query category is further based at least in part on determining that the second query further comprises a fourth entity text in the second entity category.

21. The one or more non-transitory computer-readable storage media of claim 20, wherein said entity is a first entity, wherein said entity category is a first entity category, and wherein the instructions further cause the one or more processors to perform storing a particular annotated query comprising the first entity category and the second entity category at least in part by:

replacing the first entity text in the first query with a first placeholder for any entity text in the first entity category; and
replacing the third entity text in the first query with a second placeholder for any entity text in the second entity category.

22. One or more non-transitory computer-readable storage media storing instructions, which when executed by one or more processors, cause the one or more processors to perform:

receiving a query;
detecting a first entity text in the query;
mapping the first entity text to a first entity category at least partially in response to:
(a) determining that the first entity text is among a plurality of entity texts that are mapped to a first entity of a plurality of entities, wherein a plurality of other entity texts are mapped to a plurality of other entities of the plurality of entities, and
(b) determining that the first entity is mapped to the first entity category;
determining a first keyword text for the query;
detecting a second entity text in the query;
mapping the second entity text to a second entity category at least partially in response to:
(c) determining that the second entity text is among a plurality of entity texts that are mapped to a second entity of the plurality of entities, and
(d) determining that the second entity is mapped to the second entity category;
determining a second keyword text for the query;
determining that the query matches a first annotated query comprising the first entity category and the first keyword text, the first annotated query associated with a first query category;
determining a first accuracy value by which the first annotated query refers to the first query category relative to a first number of times the first annotated query occurs in a set of queries;

determining that the query matches a second annotated query comprising the second entity category and the second keyword text, the second annotated query associated with a second query category;

determining a second accuracy value by which the second annotated query refers to the second query category relative to a second number of times the second annotated query occurs in a set of queries;

determining whether the first query category matches the second query category;

in response to said determining that the first query category matches the second query category, determining a third accuracy value by which the query is associated with the first query category based at least in part on both the first accuracy value and the second accuracy value.

23. The one or more non-transitory computer-readable storage media of claim 22, wherein the instructions further cause the one or more processors to perform:

storing a list of bits for each query category in a set of query categories, the list of bits comprising at least one bit for each annotated query in a set of annotated queries;

in response to determining that the query matches the first annotated query, storing 1 in a first bit associated with the first annotated query in the list of bits; and in response to determining that the query matches the second annotated query, storing 1 in a second bit associated with the second annotated query in the list of bits.

* * * * *